United States Patent [19]

Nielinger et al.

[11] 4,381,371

[45] Apr. 26, 1983

[54] POLYMER MIXTURES

[75] Inventors: Werner Nielinger; Bert Brassat; Rudolf Binsack; Dieter Neuray, all of Krefeld, Fed. Rep. of Germany

[73] Assignee: Bayer Aktiengesellschaft, Leverkusen, Fed. Rep. of Germany

[21] Appl. No.: 302,567

[22] Filed: Sep. 15, 1981

Related U.S. Application Data

[63] Continuation of Ser. No. 121,368, Feb. 14, 1980, abandoned.

[30] Foreign Application Priority Data

Feb. 17, 1979 [DE] Fed. Rep. of Germany ....... 2906222

[51] Int. Cl.$^3$ ..................... C08L 77/00; C08L 55/02
[52] U.S. Cl. ..................................................... 525/66
[58] Field of Search ........................................... 525/66

[56] References Cited

U.S. PATENT DOCUMENTS

| | | | |
|---|---|---|---|
| 3,134,746 | 5/1964 | Grabowski | 525/69 |
| 3,267,175 | 8/1966 | Grabowski | 525/66 |
| 3,974,234 | 8/1976 | Brinkmann | 525/66 |
| 4,221,879 | 9/1980 | Humme | 525/66 |
| 4,242,469 | 12/1980 | Schmitt | 525/66 |

FOREIGN PATENT DOCUMENTS

| | | | |
|---|---|---|---|
| 1245 | 8/1978 | European Pat. Off. | 525/66 |
| 46-2354 | 1/1971 | Japan | 525/66 |

*Primary Examiner*—Paul Lieberman
*Attorney, Agent, or Firm*—Connolly and Hutz

[57] ABSTRACT

Polymer compositions comprising amorphous polyamides and graft polymers consisting of polybutadiene and grafted units of styrene and acrylonitrile.

3 Claims, No Drawings

POLYMER MIXTURES

CROSS REFERENCE TO RELATED APPLICATION

This application is a continuation of application Ser. No. 121,368 filed Feb. 14, 1980, and now abandoned.

This invention relates to mixtures of amorphous polyamides and graft polymers of styrene and acrylonitrile on polybutadiene.

Polyamides have a number of outstanding properties, such as toughness, rigidity and hardness, which make them particularly suitable for the production of shaped articles in the technical sector.

In the case of partially crystalline polyamides, however, the optimal toughness properties are only reached after a certain quantity of water has been taken up.

Unfortunately, this time-consuming process which is known as "conditioning" leads to a reduction in hardness, E-modulus and rigidity.

The properties of non-crystalline polyamides do not show such marked dependence upon the water content. Therefore, the relatively low toughness level of amorphous polyamides is barely improved by conditioning.

Numerous trials have been made for improving the properties of partially crystalline or amorphous polyamides, for example by mixing them with other polymers.

According to German Offenlegungsschrift No. 2,403,889, amorphous polyamides are mixed with impact-strength-modified polystyrenes. In this case, the impact-strength-modified polystyrenes used may be, inter alia, mixtures or at least partly grafted products of at least 60%, by weight, of styrene or styrene/acrylonitrile units and at most 40%, by weight, of polybutadiene. The blends are distinguished by the hardness, rigidity and favourable processing behaviour, but because of the poor thoughness they are extremely brittle and, therefore, unsuitable for high-impact construction materials.

In addition, it is known from German Auslegeschrift No. 1,273,184=GB-PS No. 990.194 that graft polymers of from 10 to 60% by weight of polybutadiene as the graft base and from 40 to 90% by weight, of grafted units of styrene and acrylonitrile, may be added to poly-ε-caprolactam to improve its tensile strength. However, it is only with additions of more than 70%, by weight, of the graft polymer that the notched impact strength of the polycaprolactam may be increased.

Accordingly, it was surprising that the addition of even relatively small quantities of the above-mentioned graft polymers to amorphous polyamides would lead to a marked improvement in toughness. The toughness values pass through a maximum. The dimensional stability under heat of the mixtures remains substantially constant up to the region of the maximum. Other properties, such as flexural strength or ball indentation hardness, undergo only a slight reduction.

Accordingly, the present invention relates to polymer mixtures of amorphous polyamides and graft polymers of styrene and acrylonitrile on polybutadiene or copolymers of butadiene and α,β-unsaturated monomers which are distinguished by high toughness, high dimensional stability under heat, rigidity and hardness.

The polymer mixtures according to the present invention consist of from 99 to 40%, by weight, preferably from 95 to 70%, by weight, of an amorphous polyamide and from 1 to 60%, by weight, preferably from 5 to 30% by weight, of a graft polymerisate of (a) from 45 to 95%, by weight, preferably from 50 to 90%, by weight, of polybutadiene or copolymers of butadiene and α,β-unsaturated monomers which consist of at least 70%, by weight, of butadiene and (b) from 5 to 55%, by weight, preferably from 10 to 50%, by weight, of grafted-on units of styrene and acrylonitrile.

Preferred amorphous polyamides are products of the type described in German Offenlegungsschrift Nos. 1,595,354=GB-PS No. 1.193.487; 1,770,336=GB-PS No. 1.228.761; 1,645,537=GB-PS No. 1.210.592; 2,156,723=GB-PS Nos. 1.395.595; 2,635,085 and 2,647,311 and in U.S. Pat. Nos. 3,150,117 and 3,840,501. They are obtained by the polycondensation of diamines, such as ethylene diamine, hexamethylene diamine, decamethylene diamine dodecamethylene diamine, 2,2,4- and/or 2,4-trimethyl hexamethylene diamine, m- or p-xylylene diamine, bis(4-aminocyclohexyl)methane, bis-(4-aminocyclohexyl)propane, 3,3'-dimethyl-4,4'-diaminodicyclohexylmethane, 3-aminomethyl-3,5,5-trimethylcyclohexyl amine, 2,5- and/or 2,6-bis-(aminomethyl) norbornane or 1,4-diaminomethyl cyclohexane, with dicarboxylic acids, such as oxalic acid, adipic acid azelaic acid, decane dicarboxylic acid, heptadecane dicarboxylic acid, 2,2,4- and/or 2,4,4-trimethyl adipic acid, isophthalic acid or terephthalic acid. Copolymers, obtained by the polycondensation of several monomers are, of course, also suitable, as are copolymers of the type obtained with addition of aminocarboxylic acids, such as ε-aminocaproic acid, -ω-aminoundecanoic acid or ω-aminolauric acid, or the lactams thereof.

Particularly suitable amorphous polyamides are the polyamides produced from 80%, by weight, of equivalent quantities of adipic acid and 2,2-bis-(4-aminocyclohexyl)propane and 20%, by weight, of equivalent quantities of adipic acid and hexamethylene diamine; or of isophthalic acid and hexamethylene diamine; or of isophthalic acid, hexamethylene diamine and other diamines, such as 4,4'-diaminodicyclohexyl methane, isophorone diamine and/or 2,2,4- and/or 2,4,4-trimethyl hexamethylene diamine, 2,5- and/or 2,6-bis-(aminoethyl)-norbornane; or of isophthalic acid, 4,4'-diamino dicyclohexyl methane and -caprolactam; or of isophthalic acid, 3,3'-dimethyl-4,4'-diaminodicyclohexyl methane and 65% by weight of lauric lactam, of terephthalic acid and the isomer mixture of 2,2,4- and-/or 2,4,4-trimethyl hexamethylene diamine, or of 2,2-bis-(4-aminocyclohexyl)-propane and a mixture of azelaic acid and adipic acid in a molar ratio of 60:40.

Instead of pure 4,4'-diaminodicyclohexyl methane, it is also possible to use mixtures of the positional isomeric diaminodicyclohexyl methanes consisting of from 70 to 99 mol-% of the 4,4'-diamino isomers, from 1 to 30 mol-% of the 2,4'diamino isomers and from 0 to 2 mol-% of the 2,2'-diamino isomers and, optionally, correspondingly higher diamines, of the type obtained by hydrogenating technical diaminodiphenyl methane. Up to 30 % of the isophthalic acid may be replaced by terephthalic acid.

The graft polymerisates are known in principle. They may be produced, for example, by emulsion polymerisation of the graft monomers by means of radical initiators in a rubber latex. The rubber particles in this latex preferably have mean diameters of from 0.3 to 1μ. The diameter of these particles is not increased to a significant extent by the graft polymerisation reaction so that the particles of the graft copolymer also have the diameter indicated. Particle size and particle diameter always refer to the mean diameter $d_{50}$, i.e. the diameter above which and below which, respectively, the diameters of 50% to the particles in question lie. The degree of grafting is the ratio of graft-polymerised monomers (i.e. monomers bound chemically to the rubber) to the total quantity of polymerised monomers.

According to the present invention, therefore, graft polymerisates are also understood to include products which, in addition to the graft polymer, also contain homopolymers or copolymers of the polymers or monomers used.

The graft polymerisates preferably have a particle size of from 0.1 to $2\mu$, more particularly from 0.3 to $1\mu$, and a degree of grafting of from 0.5 to 0.9.

Suitable graft bases are polybutadienes or copolymers of butadiene and at most 30%, by weight, of $\alpha,\beta$-unsaturated monomers, such as styrene, acrylonitrile and lower alkyl esters of acrylic or methacrylic acid. Examples of such copolymers are butadiene/styrene copolymers containing up to 30 %, by weight, of styrene, copolymers of butadiene and acrylonitrile containing up to 30% by weight, of acrylonitrile and copolymers of butadiene containing up to 30 %, by weight, preferably up to 20%, by weight, of a lower alkyl ester of acrylic or methacrylic acid (for example methyl acrylate, ethyl acrylate, methyl methacrylate and ethyl methacrylate). Polybutadiene is the particularly preferred graft base.

The ratio, by weight, of the monomers grafted on, styrene to acrylonitrile, may vary within wide limits and should preferably be from 50 to 95%, by weight, of styrene to from 5 to 50% by weight of acrylonitrile.

The polymer mixtures according to the present invention are advantageously produced in an intensively kneading twin-screw extruder. However, it is also possible to use single-screw extruders and other apparatus of the type normally used for processing thermoplastic resins, for example kneaders. The two polymer components are preferably mixed at temperatures of from 230° to 300° C.

The polyamide moulding compositions according to the present invention may contain the usual additives in the known amounts such as lubricants, mould-release agents, fillers, reinforcing materials, dyes and pigments, as well as stabilisers and flameproofing agents. Suitable additives are, inter alia, glass and asbestos fibres, glass beads, talcum, wollastonite, microvit, chalk, quartz, titanium dioxide, zinc sulphide, cadmium sulphide and carbon black.

The additives are preferably added during the compounding of the moulding compositions either in pure form or in the form of concentrates. However, they may also be present in one or more of the starting components.

Since, in addition to the high toughness, thereof the products are also distinguished by the high rigidity and high tracking resistance thereof, they are preferably used for the production of components in machine construction, of technical apparatus, in the manufacture of motor vehicles and in the electrical sector.

EXAMPLE 1

A polyamide of isophthalic acid and hexamethylene diamine is mixed with a graft polymer of styrene and acrylonitrile on polybutadiene in a twin-screw extruder of the ZSK 32 type manufactured by Messrs. Werner and Pfleiderer. The temperature of the melt in the screw amounts to approximately 270° C., the throughput to 4 kg/h and the screw speed to 40 rpm.

The polyamide has a relative viscosity of 2.8, as measured on a 1% by weight solution in m-cresol at 25° C.

To produce the graft polymer (A), 14 parts, by weight, of styrene and 6 parts, by weight of acrylonitrile are grafted onto 80 parts by weight, of a coarsely particulate rubber having a mean particle diameter of the butadiene graft base present in latex form of from 0.3 to 0.4 by the emulsion polymerisation process according to German Auslegeschrift Nos. 1,247,665 and 1,269,360.

Table 1 below shows the properties of the mixtures in dependence upon the composition thereof. The values for unmodified polyamide are given for comparison in the first column.

EXAMPLE 2

A polyamide of isophthalic acid and a diamine mixture consisting of 85 mole percent of hexamethylene diamine and 15 mole percent of isophorone diamine was mixed with the graft polymer (A) in the same way as described in Example 1.

Table 2 below shows the properties of the mixtures in dependence upon the composition thereof. The values for the unmodified polyamide are given for comparison in the first column.

TABLE 1

Mixtures of the polyamide of isophthalic acid and hexamethylene diamine with the graft polymer of styrene and acrylonitrile on polybutadiene

| Composition | | | | | | | | | |
|---|---|---|---|---|---|---|---|---|---|
| Polyamide | %, by weight | 100 | 95 | 90 | 85 | 80 | 75 | 65 | 55 | 45 |
| Graft polymer | %, by weight | 0 | 5 | 10 | 15 | 20 | 25 | 35 | 45 | 55 |
| Properties: | | | | | | | | | | |
| Notched impact strength (DIN 53 453) | kJ/m$^2$ | 2.5 | 10 | 16 | 62 | 60 | 49 | 30 | 23 | 16 |
| Flexural stress at a given deflection $\delta_{bG}$ (DIN 53 452) | MPa | 156 | 139 | 134 | 105 | 115 | 90 | 64 | 53 | 41 |
| E-modulus (tensile test) (DIN 53 457) | MPa | | | | 2540 | 2140 | 2160 | | | |
| Dimensional stability under heat according to Vicat method B (DIN 53 460) | °C. | 124 | 123 | 125 | 122 | 124 | | | | |

TABLE 2

Mixtures of the polyamide of isophthalic acid, 85 mole percent of hexamethylene diamine and 15 mole percent of isophorone diamine with the graft polymer of styrene and acrylonitrile on polybutadiene

| Composition: | | | | | | | | | | |
|---|---|---|---|---|---|---|---|---|---|---|
| Polyamide | %, by weight | 100 | 95 | 90 | 85 | 80 | 75 | 65 | 55 | 45 |
| Graft Polymer | %, by weight | 0 | 5 | 10 | 15 | 20 | 25 | 35 | 45 | 55 |
| Properties: | | | | | | | | | | |
| Notched impact strength (DIN 53 453) | kJ/m$^2$ | 2 | 8 | 13 | 43 | 32 | 33 | 24 | 19 | 15 |
| Flexural stress at a given deflection $\delta_{bG}$ (DIN 53 452) | MPa | 171 | 155 | 125 | 120 | 117 | 95 | 68 | 54 | 42 |
| E-modulus (tensile test) (DIN 53 457) | MPa | | | 2660 | 2340 | | | | | |
| Dimensional stability under heat according to Vicat method B (DIN 53 460) | °C. | 141 | 141 | 142 | 140 | 143 | 136 | 133 | 129 | 122 |

EXAMPLE 3

A polyamide of isophthalic acid and terephthalic acid in a molar ratio of 95:5 and an equivalent quantity of a mixture of hexamethylene diamine and isophorone diamine in a molar ratio of 90:10 is mixed with the graft polymer (A) in the same way as described in Example 1.

Table 3 below show the properties of the mixtures in dependence upon the composition thereof. (The values for the unmodified polyamide are given for comparison in the first column.)

EXAMPLE 4

A polyamide of terephthalic acid and the isomer mixture of 2,2,4- and 2,4,4-trimenthyl hexamethylene diamine was mixed with different quantities of the graft polymer (A) in the same way as described in Example 1. The properties are as follows:

| | | | | | Comparison |
|---|---|---|---|---|---|
| Graft polymer in the mixture | %, by weight | 10 | 20 | 30 | 0 |
| Notched impact strength (DIN 53 453) | kj/m$^2$ | 13 | 47 | 33 | 7 |
| Flexural stress at a given deflection $\delta_{bG}$ (DIN 53 452) | MPa | 114 | 94 | 75 | 120 |

EXAMPLE 5

85 parts, by weight, of a copolyamide of 65%, by weight, of lauric lactam and 35%, by weight, of equivalent quantities of 3,3'-dimethyl-4,4'-diaminodicyclohexyl methane and isophthalic acid are mixed with 15 parts, by weight, of the graft polymer (A) in the same way as described in Example 1.

The mixture has a notched impact strength of 32 kJ/m$^2$ (kJ/m$^2$) and a flexural stress at a given deflection of 93 MPa (120 MPa).

(The comparison values in brackets were measured on the unmodified polyamide.)

EXAMPLE 6

A polyamide of 80%, by weight, of equivalent quantities of adipic acid and bis-(4-aminocyclohexyl)-propane and 20%, by weight, of equivalent quantities of adipic acid and hexamethylene diamine was mixed with different quantities of the graft polymer (A) in the same way as described in Example 1. The following properties were measured:

| Graft polymer in the mixture | %, by weight | 10 | 20 | 30 | 0 (for comparison) |
|---|---|---|---|---|---|
| Notched impact strength | kJ/m$^2$ | 8 | 15 | 17 | 4 |
| Flexural at a given deflection $\delta_{bG}$ | MPa | 118 | 94 | 77 | 130 |

TABLE 3

Mixtures of the polyamide of isophthalic acid and terephthalic acid (molar ratio 95:5) and hexamethylene diamine and isophorone diamine (molar ratio 90:10 with the graft polymer of styrene and acrylonitrile on polybutadiene

| Composition: | | | | | | | | | | |
|---|---|---|---|---|---|---|---|---|---|---|
| Polyamide | %, by weight | 100 | 95 | 90 | 85 | 80 | 75 | 65 | 55 | 44 |
| Graft polymer | %, by weight | 0 | 5 | 10 | 15 | 20 | 25 | 35 | 45 | 55 |
| Properties: | | | | | | | | | | |
| Notched impact strength (DIN 53 453) | kJ/m$^2$ | 3 | 9 | 16 | 56 | 57 | 42 | 28 | 21 | 16 |
| Flexural stress at a given deflection $\delta_{bG}$ (DIN 53 452) | MPa | 166 | 149 | 138 | 117 | 112 | 92 | 70 | 55 | 40 |
| E-modulus (tensile test) (DIN 53 457) | MPa | | | 2160 | 2240 | 2240 | | | | |
| Dimensional stability under heat according to Vicat, method B (DIN 53 460) | °C. | 135 | 135 | 137 | 133 | 136 | 129 | 126 | 122 | 117 |

-continued (DIN 53 452)

EXAMPLE 7

83 parts, by weight, of a polyamide of isophthalic acid and a diamine consisting of 85 mole percent of hexamethylene diamine and 15 mole percent of a mixture of the position-isomeric diaminodicyclohexyl methanes containing 4.2% of the 2,4'-diamino isomer and 0.2% of the 2,2-diamino isomer in addition to the 4,4'-diamino isomer were mixed with 17 parts, by weight, of the graft polymer (A) in the same way as described in Example 1.

The mixture has a notched impact strength of 43 kJ/m$^2$ (2.9 kJ/m$^2$) and a flexural stress at a given deflection of 112 MPa (170 MPa). (The comparison values in brackets were measured on the unmodified polyamide).

EXAMPLE 8

To produce a graft polymer (B) containing 50 parts, by weight, of rubber, 36 parts, by weight of styrene and 14 parts, by weight, of acrylonitrile are grafted onto 50 parts, by weight, of a coarsely particulate rubber having a mean particle diameter of the polybutadiene graft base present in latex form of from 0.3 to 0.4μ by the emulsion polymerisation process according to German Auslegeschrift Nos. 1,247,665 and 1,269,360.

85 parts, by weight, of a polyamide of isophthalic acid and hexamethylene diamine are mixed with 15 parts, by weight, of the graft polymer (B) in the same way as described in Example 1.

The mixture has a notched impact strength of 17 kJ/m$^2$ and a flexural stress at a given deflection of 125 MPa.

EXAMPLE 9

88 parts, by weight, of a polyamide of isophthalic acid and hexamethylene diamine are mixed with 6 parts, by weight, of the graft polymer (A) and 6 parts, by weight, of the graft polymer (B) in the same way as described in Example 1.

The mixture has a notched impact strength of 17 kJ/m$^2$ and a flexural stress at a given deflection of 128 MPa.

We claim:

1. A polymer composition comprising:
   (I) from 95 to 70%, by weight, of one or more amorphous polyamides; and
   (II) from 5 to 30%, by weight, of one or more graft polymers consisting of
   (a) as graft base, from 50 to 90%, by weight, of a polymer of butadiene and optionally up to 30%, by weight, of one or more α,β-unsaturated monomers; and
   (b) as a grafted unit, from 5 to 55%, by weight, of styrene and acrylonitrile.

2. A composition as claimed in claim 1 comprising, as (II) (b), from 50 to 95%, by weight, of styrene and from 5 to 50%, by weight, of acrylonitrile.

3. A composition as claimed in claim 1 wherein said one or more α,β- unsaturated monomers is styrene, acrylonitrile or lower alkyl esters of methacrylic acid.

* * * * *